United States Patent [19]

Matsushima

[11] Patent Number: 4,923,537

[45] Date of Patent: May 8, 1990

[54] METHOD FOR SHAPING A RESIN COATING OF A WIRE HARNESS

[75] Inventor: Yuzo Matsushima, Utsunomiya, Japan

[73] Assignee: Honda Giken Kogyo Kabushiki Kaisha, Tokyo, Japan

[21] Appl. No.: 308,218

[22] Filed: Feb. 9, 1989

[30] Foreign Application Priority Data

Feb. 12, 1988 [JP] Japan .................................. 63-28821

[51] Int. Cl.$^5$ ............................................. H01B 13/06
[52] U.S. Cl. ..................................... 156/48; 156/52;
156/79; 174/110 F; 174/116; 264/46.5;
264/46.9; 264/272.14; 264/272.15; 428/304.4;
428/379
[58] Field of Search .................... 29/856, 858; 156/48,
156/49, 51, 52, 79; 174/110 F, 116; 264/46.5,
46.8, 46.9, 272.11, 272.13, 272.14, 272.15;
428/304.4, 379

[56] References Cited

U.S. PATENT DOCUMENTS

| 3,172,072 | 3/1965 | Willy | 174/110 F |
| 3,226,463 | 12/1965 | Wallace | 264/272.14 |
| 3,985,951 | 10/1976 | Harris | 156/79 X |
| 4,270,961 | 6/1981 | Faranette et al. | 156/51 |
| 4,647,716 | 3/1987 | Akiyama et al. | 156/52 X |
| 4,789,512 | 12/1988 | Hughes | 264/272.11 X |

Primary Examiner—Robert A. Dawson
Attorney, Agent, or Firm—Armstrong, Nikaido, Marmelstein, Kubovcik & Murray

[57] ABSTRACT

A resin coating of a wire harness is shaped in the following manner. A laminated sheet formed by integrally laminating an outer skin sheet made of semi-hard resin and an unfoamed foamable sheet made of foamable resin material, is placed along a cavity wall surface of a shaping mold with the foamable sheet directed to the inside, a bundle of wires having terminals, connectors or the like attached to their opposite ends are disposed within a space defined by the laminated sheet, and by heating the shaping mold the foamable sheet is heated and foamed. A protective coating layer made of foamed resin and protective coating layer made of an outer skin sheet can be simultaneously shaped by the mold.

6 Claims, 3 Drawing Sheets

METHOD FOR SHAPING A RESIN COATING OF A WIRE HARNESS

BACKGROUND OF THE INVENTION

1. Field of the Invention

The present invention relates to a method for shaping a resin coating of a wire harness mainly employed as a wiring for use in a motorcar.

2. Description of the Prior Art

In a wire assembly called "wire harness", wires are preliminarily arranged and bundled so as to conform to the shape under a mounted condition and terminals, connectors or the like for connection are mounted at their terminal ends, in order that they can be easily mounted to a motorcar being assembled on a conveyor line. In a wire harness, wires are assembled, bundled and protected through the process of wrapping an insulating vinyl tape around an outer periphery of bundled wires, inserting bundled wires into a vinyl tube (mechanical protection), inserting bundled wires into a corrugated tube (mechanical and thermal protection) or the like. The process of insesting a bundle of wires wrapped with an insulating vinyl tape into a corrugated tube is a commonly used proses, and the thus formed wire harness is fixed to a vehicle body at a large number of points with holding pieces (clips) by flexing the flexible corrugated tube so as to conform to the configuration of the vehicle body.

In the above-mentioned process of employing a corrugated tube as a protective member for a wire harness, besides the troublesome work of wrapping an insulating vinyl tape around the entire outer periphery of the wires, the work of fixing the wire harness to a vehicle body at a large number of points with holding pieces, had to be effected, hence a working efficiency was poor, and it was a principal cause for prevention of improvements in a productivity.

SUMMARY OF THE INVENTION

The present invention has been worked out under the above-mentioned circumstance of the art, and it is one object of the invention to form a protective coating efficiently about an outer periphery of bundled wires.

The above-mentioned object can be achieved though the steps of employing a laminated sheet formed by integrally laminating an outer skin sheet made of semi-hard resin material and an unfoamed foamable sheet made of formable resin, placing the aforementioned laminated sheet along a cavity wall surface of a shaping mold with the above-described foamable sheet layer directed to the inside, disposing a bundle of wires having terminals, connectors or the like attached to their opposite ends within a space defined by the above-mentioned laminated sheet, heating and foaming the above-mentioned foamable sheet layer by heating the above-described shaping mold, and thereby coating the above-described bundle of wires with a foamed resin layer and an outer skin sheet made of semi-hard resin.

The outer skin sheet employed according to the present invention is preferably formed of semi-hard vinyl chloride resin, a blend of semi-hard vinyl chloride resin and ABS resin (polymer blend ), or olefinic elastomer, and as a preferable material for the foamable sheet, material prepared by adding a volatile blowing agent such as aliphatic hydrocarbon having C5–C7 or a nitrogen compound to resin such as polyethylene, polypropylene, ethylene-vinyl-acetate, polyurethane or epoxy resin, is employed.

According to the present invention, owing to the fact that an outer skin sheet and a foamable sheet are integrally laminated to form a laminated sheet, this is placed along a cavity wall surface of a shaping·mold, a bundle of wires are disposed within a space defined by the foamable sheet layer of the laminated sheet and the foamable sheet is heated and foamed, protective coating of wires by means of a foamed resin layer and an outer skin sheet can be effected simultaneously, the resin coating shaping operation by means of the shaping mold is also very simple, and so, improvements in productivity by reduction of manhours can be achieved. In addition, as compared to the method of placing an outer skin sheet along a cavity wall surface of a shaping mold, injecting foamable resin liquid to the interior and foaming the resin, advantages are obtained such that (1) an air accumulation is hardly produced, (2) since the bundle of wires disposed within the cavity is pushed equally in every direction by an expanding force of the foamable layer upon foaming and they are positioned naturally at the center portion, there is no need to position the wires within the cavity and hold them in position, and (3) a troublesome work of injecting foamable resin liquid into a cavity and foaming the resin is unnecessary.

The above-mentioned and other objects, features and advantages of the present invention will become more apparent by reference to the following description of preferred embodiments of the invention taken in conjunction with the accompanying drawings.

DESCRIPTION OF THE PREFERRED EMBODIMENTS

Figure 1:
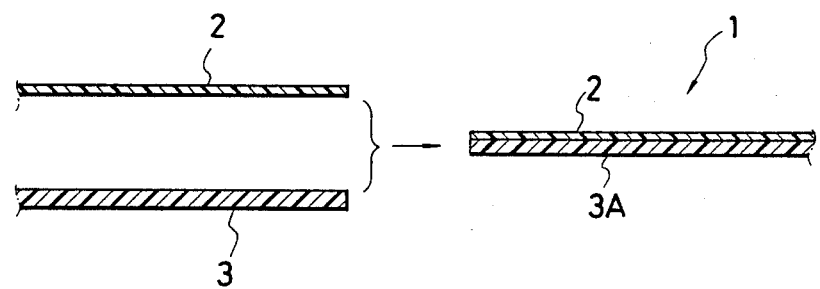
FIG. 1 is a schematic cross-section view showing the mode of laminating an outer skin sheet made of semi-hard resin and an unfoamed foamable sheet.

According to one preferred embodiment of the present invention, a wire harness having a resin coating was produced and shaped through the following steps of a process:

(1) A laminated sheet 1 formed by laminating and joining an outer skin sheet 2 made of semi-hard vinyl chloride resin (wall thickness; 0.3–1.0 mm) and a foamable sheet 3 (ethylene-vinyle-acetate), is prepared (FIG. 1).

Figure 2:
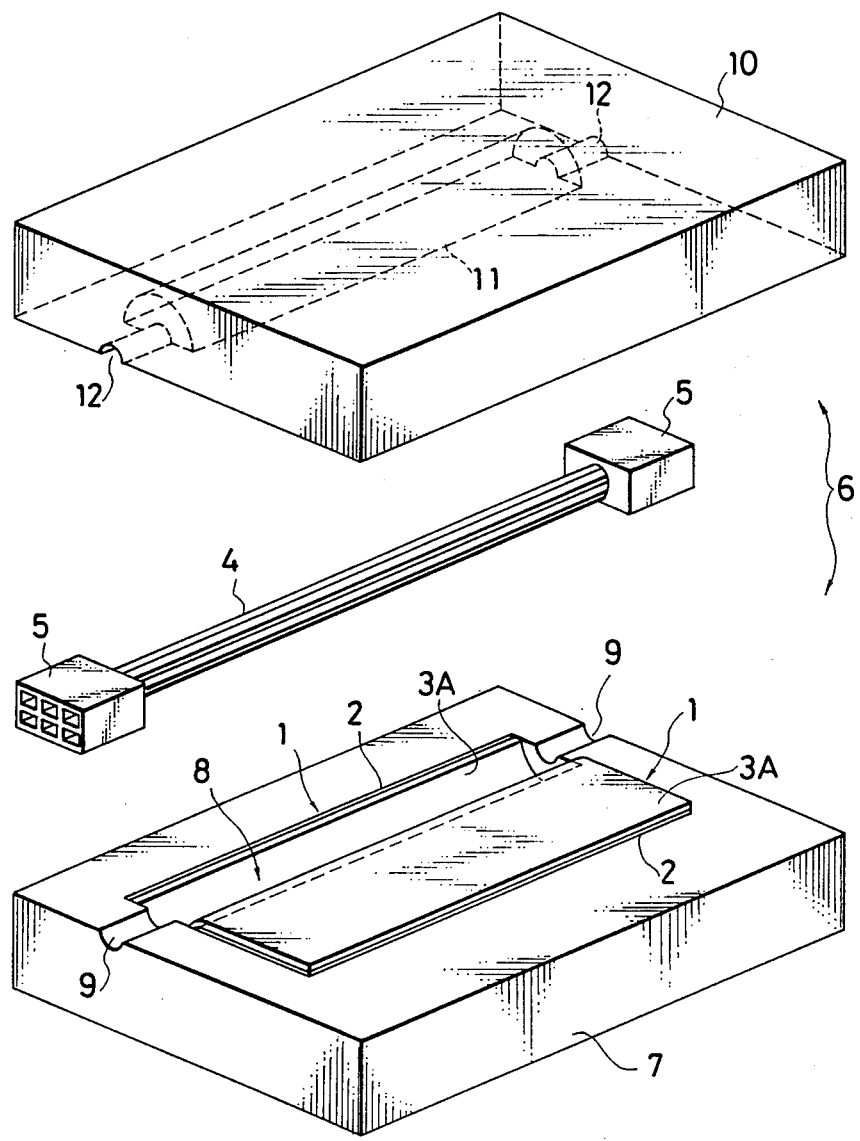
FIG. 2 is a perspective view showing a bundle of wires provided with connectors, a shaping mold and a laminated sheet placed along a cavity wall surface of the same shaping mold.

(2) A shaping mold 6 consisting of a lower mold 7 and an upper mold 10 is prepared, and the laminated sheet 1 is set so as to extend along a wall surface of a cavity 8 formed in the lower mold 7. At this moment, the outer skin sheet 2 is directed to the outside and thus brought into contact with the wall surface of the cavity 8, while the foamable sheet layer 3A is directed to the inside (the exposed side). The remainder of the laminated sheet 1 protruding from the cavity 8 is eventually extended along a wall surface of a cavity 11 formed in the upper mold 10 to be placed on the lower mold 7. Subsequently, a bundle of wires 4 having connectors 5,5 attached to their opposite ends are positioned and set within grooves 9 for wires (FIG. 2).

Figure 3:
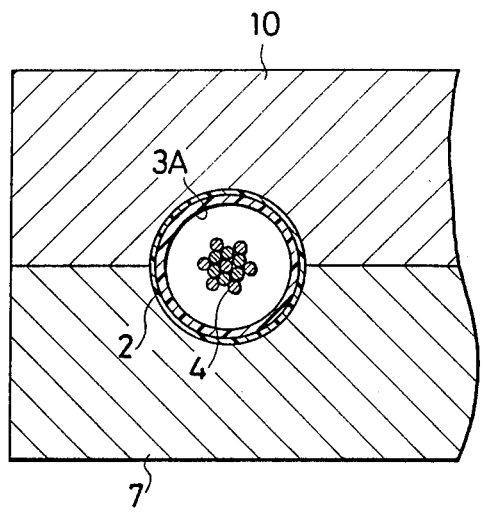
FIG. 3 is a cross-section view showing the state where a bundle of wires and a laminated sheet have been set within assembled upper and lower shaping molds.

(3) The upper mold 10 is placed on the lower mold 7, the remainder of the above-mentioned laminated sheet 1 is extended along the wall surface of the cavity 11, and the bundle of wires 4 are pinched by grooved portions 9 and 12 for wires formed in the lower mold 7 and the upper mold 10, respectively. Under this condition, the bundle of wires 4 are positioned nearly at the center of the space defined by the foamable sheet layer 3A (FIG. 3).

(4) The foamable sheet layer 3A is foamed by heating the entire shaping mold 6 and holding the foamable sheet layer 3A at a temperature of about 150° C. for 1–3 minutes. A volume expansion rate of the foamable sheet layer 3A is about 3–10 folds, and the thickness of the foamable sheet layer 3A could by determined by taking into consideration the expansion rate.

Figure 4:
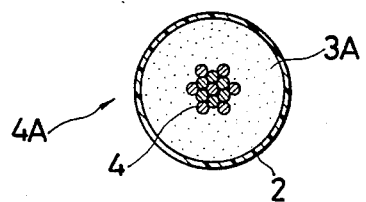
FIG. 4 is a cross-section view of a wire harness product formed by heating and foaming a foamable sheet layer, as starting from the state shown in FIG. 3.

(5) The obtained wire harness 4A (FIG. 4) is flexed and shaped under the heated condition so as to conform to the configuration of the vehicle body.

In view of the fact that the flexed and shaped wire harness 4A has its outer skin sheet 2 formed of semi-hard vinyl chloride resin having a wall thickness of 0.3–1.0 mm, the wire harness 4A has a sufficiently large rigidity for maintaining its shape, hence the number of fixing points to a vehicle body can be greatly reduced as compared to the prior art, and thereby reduction of the number of holding pieces for fixing and improvements in a working efficiency of a vehicle body assembling work can be contemplated.

It is to be noted that while the above-described laminated sheet 1 is a band-like body having a width corresponding to an entire circumferential length of the cavities 8 and 11 of the lower mold 7 and the upper mold 10, a pair of band-like bodies of half-split type corresponding to the cavities 8 and 11, respectively, could be employed in combination.

As will be apparent from the above description, according to the present invention, the following advantages can be obtained:

(1) Protective coating of wires by means of a foamed resin layer and an outer skin sheet is effected simultaneously, a shaping operation for the resin coating by the shaping mold is also very simple, and improvements in a productivity by reduction of man-hours can be achieved.

(2) Since the bundle of wires disposed within the cavity are pushed in every direction by expanding forces upon foaming of the foamable sheet layer and naturally positioned at the center portion, there is no need to center the wires within the cavity and to hold them in position.

(3) If the thickness of the outer skin sheet made of semi-hard resin is chosen at an appropriately large size, a sufficiently large rigidity of the wire harness can be insured, after completion of foaming of the foamable sheet layer, and the wire harness maintains its flexed and shaped form conformed to the configuration of the vehicle body. A number of fixing points to the vehicle body can be reduced, and thereby reduction of a number of holding pieces for fixing and improvements in a working efficiency of an assembling work can be contemplated.

(4) The structure of the bundle of wires coated with a foamed resin layer and a semi-hard resin outer skin, is excellent in thermal insulation and electrical insulation, and effectively protects the wires against the action of external forces.

While a principle of the present invention has been described above in connection to one preferred embodiment of the invention, it is a matter of course that many apparently widely different embodiments of the invention can be made without departing from the spirit of the present invention.

What is claimed is:

1. A method for shaping a resin coating of a wire harness comprising steps of placing a laminated sheet formed by integrally laminating an outer skin sheet made of semi-hard resin and an unfoamed foamable sheet made of foamable resin material along a cavity wall surface of a shaping mold with said foamable sheet directed to the inside, disposing a bundle of wires having terminals, connectors or the like attached to their opposite ends within a space defined by said laminated sheet, heating and foaming said foamable sheet by heating said shaping mold, and thereby coating said bundle of wires with a foamed resin layer and the outer skin sheet made of semi-hard resin.

2. A method as claimed in claim 1, wherein said outer skin sheet is made of semi-hard vinyl chloride resin, a blend of semi-hard vinyl chloride resin and ABS resin, or olefinic elastomer.

3. A method as claimed in claim 1 or 2, wherein said foamable sheet is made of material prepared by adding a blowing agent to resin selected from a group consisting of polyethylene, polypropylene, ethylene-vinyl-acetate, polyurethane and epoxy resin.

4. A method as claimed in claim 3, wherein said blowing agent is aliphatic hydrocarbon or a nitrogen compound.

5. A method as claimed in claim 1, wherein said shaping mold consists of an upper mold and a lower mold, and said laminated sheet forms a band-shapes body having a width corresponding to an entire circumferential length of a cavity defined by said upper and lower molds.

6. A method as claimed in claim 1, wherein said shaping mold consists of an upper mold and a lower mold, and separate laminated sheets are respectively placed along the cavity wall surface of said lower mold and along the cavity wall surface of said upper mold.

* * * * *